July 14, 1964   B. E. ASH   3,140,577
APPARATUS FOR MANUFACTURING CABLES
Filed March 20, 1963   2 Sheets-Sheet 1

Inventor
BERNARD E. ASH
By *Percy P. Lainby*
Attorney 3,140,577
APPARATUS FOR MANUFACTURING CABLES
Bernard Edwin Ash, London, England, assignor to International Standard Electric Corporation, New York, N.Y., a corporation of Delaware
Filed Mar. 20, 1963, Ser. No. 266,745
Claims priority, application Great Britain Mar. 22, 1962
11 Claims. (Cl. 57—59)

This invention relates to apparatus for manufacturing telecommunication cables having insulated conductors grouped by twisting them together.

In telecommunication cables having insulated conductors grouped, for example, in pairs or quads by twisting them together, it is advantageous for each group to have different angles of lay in order to reduce inductive disturbances between the groups. It is known, for example, from United States Patent No. 2,869,316, to make the angle of lay constant for given periods of time and to vary the angle for each period in a random manner.

It is an object of the present invention to provide an apparatus for manufacturing telecommunication cables having insulated conductors grouped by twisting each group with different angles of lay whereby the angle of lay of each group is continuously varied.

It is another object of this invention to provide apparatus for manufacturing cables having insulated conductors grouped by twisting them together and wherein the angle of lay of each conductor is continuously varied.

According to the present invention a method of manufacturing a telecommunication cable having insulated conductors grouped by twisting them together includes the step of continuously changing the angle of lay, the amount of change in the angle of lay being determined both by a random value selected from a range and the average twist already imparted to the group.

As the angle of lay of each group is continuously changed in a random manner it follows that the total change over a given length will also be random. If a number of groups are twisted on different machines all starting with the same angle of lay, then at any subsequent corresponding point along the groups the various angles of lay will be randomly distributed. In addition, the angle of lay already imparted to a group is continuously measured and resolved into an average value. The average value is then preferably compared with a selected value and the difference used to produce an additional variation in the angle of lay. This has the effect of correcting any prolonged variations in the average angle of lay of the group.

Figure 1:
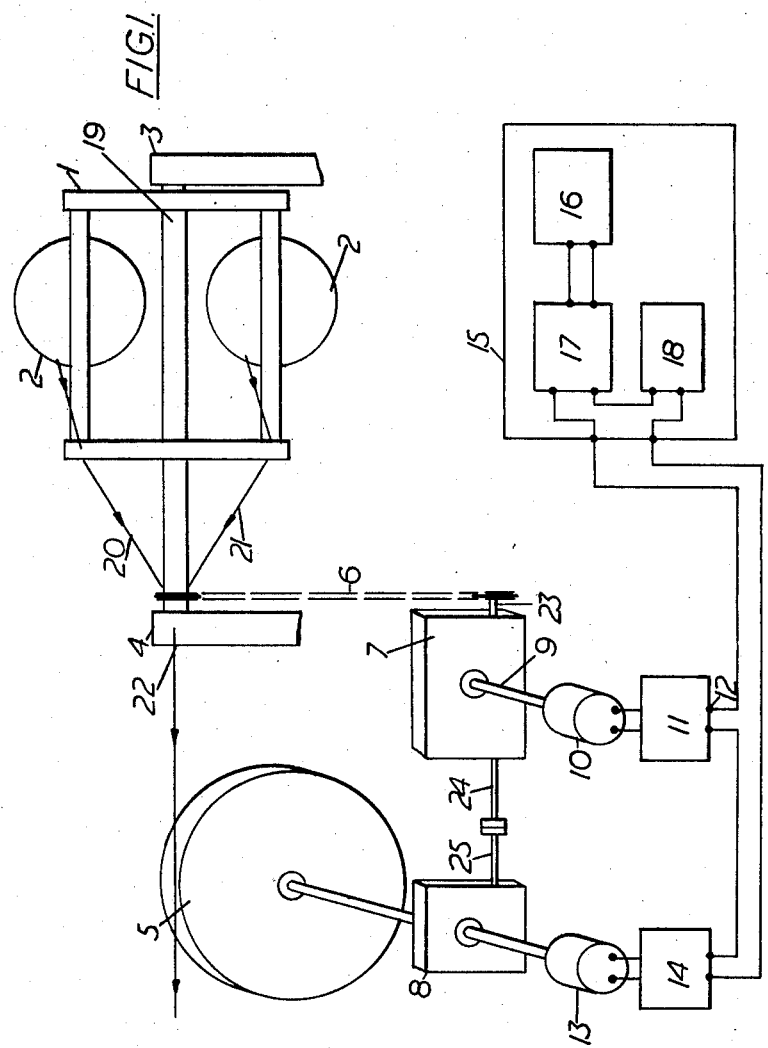
Figure 2:
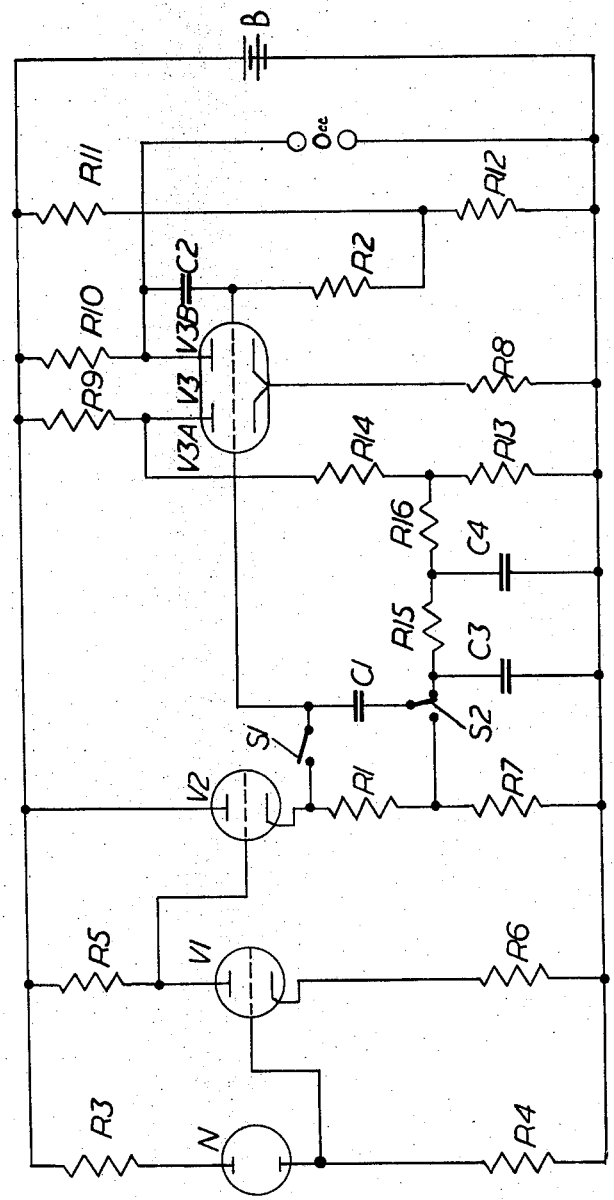

The above-mentioned and other features and objects of this invention will become more apparent by reference to the following description taken in conjunction with the accompanying drawings, in which:

FIGURE 1 is a schematic view of one embodiment for twisting together a pair of insulated conductors for a telecommunication cable; and FIGURE 2 is a schematic view of a control circuit in accordance with my invention.

Referring now to FIGURE 1, carriage 1, keyed to hollow shaft 19, has two braked bobbins 2 of insulated conductors mounted on it. Hollow shaft 19 is supported in bearings 3 and 4 and coupled to a driving motor (not shown). Shaft 19 has two holes through which insulated wires 20 and 21 pass after being unwound from bobbins 2 and guided over carriage 1. Wires 20 and 21 are twisted together inside shaft 19, emerge at 22 and pass over capstan 5 to a take-up drum (not shown). Chain drive 6 connects shaft 19 with input shaft 23 of a variable ratio gear-box. Output shaft 24 of gear-box 7 is coupled to input shaft 25 of worm reduction gear 8 which drives capstan 5.

Ratio control shaft 9 of gear-box 7 is driven by pilot motor 10 which is powered by a power-supply unit in the form of a power pack 11 of known type which produces a speed in either direction in proportion to the value of a voltage applied to input terminals 12. A rate or tachometer generator 13 is coupled to worm reduction gear 8 so that it is driven at the same speed as capstan 5. The output of generator 13 is passed through a long time constant filter 14 of a known type which produces an average value of the voltage developed by generator 13. The output from generator 13 is in series with control unit 15 which includes a random voltage generator 16 of known type which has its output sampled at regular intervals by gating circuit 17, also of known type, which retains the level of the sampled voltage at its output until the next sample is taken.

Bias generator 18 of known type is in series with gating circuit 17. Gating circuit 17 is coupled to bias generator 18 so that when the output of generator 18 is added to the output from gating circuit 17, the total output has an average value of equal and opposite potential to the output from generator 13 when it is running at a speed corresponding to the desired mean length of twist.

In operation, carriage 1 is rotated causing chain drive 6 to drive input shaft 23 of gear-box 7 so that output shaft 24 drives capstan 5 through worm reduction gear 8. Rate generator 13 generates a voltage which is passed through long time constant filter 14 to be emitted from it as an average value for the period of the time constant. This average voltage is therefore proportional to the average of all of the angles of lay which are produced within the period of the time constant of filter 14 as they are derived from the movement of capstan 5. The outputs from filter 14 and gating circuit 17 are added and the resulting voltage is applied to input terminals 12 of power pack 11. Power pack 11 thus energizes pilot motor 10 causing it to run for constant periods of time at randomly selected speeds in either direction modified by the effect of the voltage from filter 14 which tends to increase speeds in one direction and reduce speeds in the opposite direction according to the error which exists in the average angle of lay. As the rotation of pilot motor 10 causes a change in the ratio of gear-box 7 and consequently a change in the angle of lay, it follows that the rate of change of the angle of lay is proportional to the speed of pilot motor 10. This results in the machine producing angles of lay which change at randomly selected rates for equal periods of time, the changes being so averaged that the long term average angle of lay remains approximately constant.

Refer now to FIGURE 2 which shows a different method of driving capstan 5 (FIGURE 1) and which makes a greater use of electronic circuits. FIGURE 2 illustrates a control circuit for producing an output voltage which will rise and fall between specific limits at a rate which is both randomly selected and changed at regular intervals in time. The output from the control circuit governs the speed of a motor which drives the capstan of the twisting machine.

In the control circuit of FIGURE 2 a random voltage is obtained from a neon tube N, triodes $V_1$ and $V_2$, capacitance $C_1$, resistances $R_1$, $R_3$, $R_4$, $R_5$, $R_6$, and $R_7$ and switches $S_1$ and $S_2$. The rate of change of the random voltage is proportional to its deviation from a predetermined value determined by a paraphase integrating tube $V_3$, capacitance $C_2$ and resistances $R_2$, $R_8$, $R_9$, $R_{10}$, $R_{11}$, and $R_{12}$. The long term averaging of the angle of lay is carried out by a smoothing network composed of capacitors $C_3$ and $C_4$ and resistors $R_{13}$, $R_{14}$, $R_{15}$, and $R_{16}$. Energy is supplied to the control circuit by battery B.

In operation, neon tube N is adjusted by means of resistors $R_3$ and $R_4$, and tube $V_1$ is adjusted by means of resistors $R_5$ and $R_6$ so that it conducts only at the noise peaks to give an average of, for example, 1000 peaks per second. The amplified output from tube $V_1$ is fed to a cathode follower stage in the form of triode $V_2$ which produces a series of variations in the voltage across resistance $R_1$. Capacitor $C_1$ is connected across resistance $R_1$ for a period of, say 10 milliseconds by means of switches $S_1$ and $S_2$ which are closed by a common cam. Because tube $V_2$ is a cathode follower stage, its output impedance is very low and therefore it rapidly charges or discharges capacitance $C_1$ to an average value of the output voltage across resistance $R_1$ during the time that capacitance $C_1$ is connected. This voltage will be random in value.

When switches $S_1$ and $S_2$ are open, the voltage stored in capacitance $C_1$ is applied to the input grid of paraphase integrating tube $V_3$. If the voltage across capacitance $C_1$ drives this grid more positive than its bias potential, which has been adjusted by resistance $R_8$, $R_9$, and $R_{10}$ to a predetermined value, the current in the cathode of tube $V_3$ will rise making the cathode more positive. This will reduce the current drawn by anode $V_{3B}$ and consequently raise its potential, but capacitor $C_2$ will tend to make the potential from the grid of tube $V_3$ change in sympathy with anode $V_{3B}$ and so offset the effect of change in the cathode potential. This results in all the potentials of tube $V_3$ rising by approximately the same amount. There is now a potential across resistance $R_2$ which will result in a current which charges capacitance $C_2$, bringing the grid back to normal, but as this happens anode $V_{3B}$ is allowed to become more positive, which tends to prolong the charging current in $R_2$ and maintain the grid of tube $V_3$ in its positive condition. This progressive change will continue until anode $V_{3B}$ has reached a potential equal to the grid signal or deviation of $V_3$ multiplied by the normal gain of the tube $V_3$ and provided that this stage is not reached, the rate of change of the output from anode $V_{3B}$ will be proportional to the deviation of the grid voltage of $V_3$ from its bias potential.

A fraction of the anode potential of $V_{3A}$, which varies in opposite phase to that of $V_{3B}$, is smoothed by resistors $R_{13}$, $R_{14}$, $R_{15}$, and $R_{16}$, and capacitors $C_3$ and $C_4$ so that the potential across capacitor $C_3$ is varied in relation to the output voltage. This is combined in series with the voltage charge in capacitor $C_1$ to provide a correction to the grid voltage of tube $V_3$ which will cause the output to move slowly towards its mean value in the absence of any change in the charge of capacitor $C_1$. The switches $S_1$ and $S_2$ repeatedly sample, for approximately 10 milliseconds, the output of tube $V_2$ at regular intervals of, for example, 10 seconds and as a result, the output from anode $V_{3B}$ will move up and down with a series of uniform changes each dependent upon the charge in capacitor $C_1$ and each lasting for 10 seconds. If the average of these angles of lay is not zero then the correction network will produce a change to make up the difference.

In order to facilitate starting and stopping the capstan without interfering with the balance of the average lay correction network a D.C. generator is coupled to the drive motor of the carriage 1 (FIGURE 1). The field exciting voltage of this generator is made proportional to the output Occ of the control circuit of FIGURE 2 and the output from this generator is used to drive the capstan motor.

While I have described above the principles of my invention in connection with specific apparatus, it is to be clearly understood that this description is made only by way of example and not as a limitation to the scope of my invention as set forth in the accompanying claims.

What is claimed is:

1. Apparatus for manufacturing a cable having conductors grouped by twisting them together comprising: twisting means for twisting the conductors about each other, means for moving the twisted conductors away from said twisting means, control means coupled to said moving means for continuously and randomly changing the rate of movement of said conductors by an amount which depends on a value randomly selected from a range and the angle of lay previously imparted to said conductors, said control means comprising; means for sampling the angle of lay previously imparted to the conductors, means for selecting a radom value from a range of values, and means for comparing said sampled angle and said radomly selected value, wherein said means for selecting a random value comprises; means for sampling the potential across a first capacitor, means for causing the potential of the capacitor to correspond to a randomly selected potential from a range of potentials, and means including a neon tube for producing a random potential within a range of random potentials.

2. Apparatus according to claim 1 wherein said sampling means comprises a paraphase integrator tube, and means for sampling the potential of one anode of said paraphase integrator tube and causing a proportion of this potential to be fed to said first capacitor.

3. Apparatus acording to claim 2 wherein said comparing means comprises means for sampling the other anode of said paraphase integrator tube.

4. Apparatus according to claim 3 wherein said twisting means comprises a carriage, braked bobbins having conductors wound thereon rotatably supported on said carriage, a hollow shaft for rotatably mounting said carriage, means for rotating said carriage, and said moving means includes a capstan for drawing the conductors off said braked bobbins through said hollow shaft.

5. Apparatus according to claim 4 wherein said control means controls the speed of said capstan.

6. Apparatus for manufacturing cables having groups of conductors, the conductors of each group being twisted together, comprising: twisting means for twisting the conductors of each group about each other, means for moving the twisted conductors away from said twisting means, control means coupled to said moving means for continuously and randomly changing the angle of lay of said conductors including means for sampling the average angle of lay previously imparted to said conductors, means for selecting a random value from a range of values comprising; a random voltage generator and a gating circuit which samples the output of said random voltage generator at regular intervals, means for comparing said sampled and said random value, and means responsive to said comparing means for controlling said moving means.

7. Apparatus according to claim 6 wherein said means for sampling the average angle of lay previously imparted to said conductors comprises a tachometer generator and a long time constant filter which produces an average value of the voltage developed by said generator.

8. Apparatus according to claim 7 wherein said twisting means comprises a carriage, braked bobbins having conductors wound thereon rotatably supported on said carriage, a hollow shaft for rotatably mounting said carriage, means for rotating said carriage, and said moving means includes a capstan for drawing the conductors off said braked bobbins through said hollow shaft.

9. Apparatus according to claim 8 wherein said tachometer generator is driven by said capstan.

10. Apparatus for manufacturing a cable having conductors, the conductors of each said group being twisted together comprising: twisting means for twisting the conductors in each group about each other, a capstan for drawing said conductors away from said twisting means, means for driving said capstan, and control means for continuously and randomly changing the rate of movement of said capstan including a tachometer generator coupled to said capstan, and means for sampling the average voltage produced by said generator during specific periods of time.

11. Apparatus as claimed in claim 10 wherein said control means further comprises means for producing a random voltage within a range of voltages, means for adding said sampled and said random voltage, and means for applying said added voltage to said driving means.

References Cited in the file of this patent

UNITED STATES PATENTS

| | | |
|---|---|---|
| 1,774,880 | Francis | Sept. 2, 1930 |
| 2,869,316 | Lilly | Jan. 20, 1959 |

FOREIGN PATENTS

| | | |
|---|---|---|
| 635,851 | Germany | Oct. 1, 1936 |
| 356,376 | Great Britain | Sept. 10, 1931 |